Sept. 20, 1949.    E. D. TILLYER    2,482,698
OPTICAL LENS MEANS HAVING A NONSPHERICAL
REFRACTING SURFACE
Original Filed May 6, 1943    2 Sheets-Sheet 1

INVENTOR.
EDGAR D. TILLYER
BY Louis L. Gagnon
ATTORNEY

Sept. 20, 1949.　　　　　　E. D. TILLYER　　　　　　2,482,698
OPTICAL LENS MEANS HAVING A NONSPHERICAL
REFRACTING SURFACE
Original Filed May 6, 1943　　　　　　　　　　2 Sheets-Sheet 2

INVENTOR.
EDGAR D. TILLYER
BY
ATTORNEY

Patented Sept. 20, 1949

2,482,698

UNITED STATES PATENT OFFICE 2,482,698

OPTICAL LENS MEANS HAVING A NON-SPHERICAL REFRACTING SURFACE

Edgar D. Tillyer, Southbridge, Mass., assignor to American Optical Company, Southbridge, Mass., a voluntary association Original application May 6, 1943, Serial No. 485,843. Divided and this application February 15, 1945, Serial No. 578,032

3 Claims. (Cl. 88—57)

This invention relates to devices formed of vitreous material and with non-spherical surfaces.

The application is a division of my co-pending application Serial No. 485,843, filed May 6, 1943.

One of the principal objects of the invention is to provide devices formed of vitreous material with critically controlled optical surfaces.

Another object is to provide articles of the above character having critically controlled non-spherical optical surfaces thereon resulting from the shaping of said surfaces by dropping said articles under the action of heat.

Another important object is to provide an accurately controlled article formed by dropping said article on a refractory block to the shape desired under the action of heat whereby the surface shape of said article resulting from said dropping will be more accurately controlled.

Another object is to provide novel means of initially forming and controlling the shape of the supporting surface of the refractory whereby the surface shapes on the resultant articles will be of the accurate desired shapes.

Another object is to provide Schmidt plates so as to have relatively high ultra-violet transmission.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims. I, therefore, do not wish to be limited to the exact details of construction and arrangement of parts shown and described as the preferred forms only have been given by way of illustration.

Dropping glass articles on refractories to produce controlled surface curvatures is not new in the art. Several different methods have been devised for accomplishing this result. Difficulties, however, were encountered with most prior art methods in that the known available materials used in forming the support on which the articles were dropped possessed inherent undesirable characteristics. In most instances, the materials were of such a nature that the glass articles supported thereby had a tendency to adhere to the surface of the support when subjected to heat of the required temperature to drop said articles to the shape of the supporting surface.

Another difficulty of major magnitude was that the available materials from which such prior art supports were formed had a tendency to expand or contract very differently than the glass and inconsistently at some temperatures within the heating cycle required in heating and dropping the articles to the shapes desired. This variation of expansion and contraction introduced difficulty in controlling the accuracy of the resultant surface formed on the dropped articles.

Another difficulty is that some supports during heating and cooling tend either to grow or decrease in dimension in repeated cycles thereby rendering such supports impractical for repetitive use.

In many instances, in the past, in order to avoid adhesion of the dropped articles to the supporting surface the said supporting surface was initially dusted or sprayed with powdery materials, such as graphite, very fine clay in water suspension or similar materials. These, of course, could not be uniformly applied and also introduced difficulties in obtaining accurately formed surfaces.

Another difficulty, even when dropping single sheets of glass material, was encountered in having the dusting material settling on the surface of the article being dropped with the result that the said dusting material became embedded in the surface and thereby rendered the article impractical for use.

One of the prime objects therefore is to overcome all of the above difficulties of the prior art and to produce an article formed by dropping with an accurately controlled optical surface.

Another feature of the present invention is the provision of refractory means for forming dropped articles of the above character which will more positively retain its initial shape during use and which will inherently prevent surface adhesion of the formed articles to the supporting surface of the refractory.

Referring more particularly to the drawings.

Schmidt plates are designed particularly for use in conjunction with spherical mirrors. The surface curvatures required to obtain such corrections are of irregular shape and must be accurately controlled in order to produce the desired results. Because of the particular irregularity of said surface shapes it has been extremely difficult, if not impossible, in the past, to form the surfaces of said plates by known grinding and polishing methods requiring considerable time and expense in obtaining the desired surface shapes and involving extreme difficulty in obtaining such plates in large quantities and with consistent surface shapes.

Figure 1:
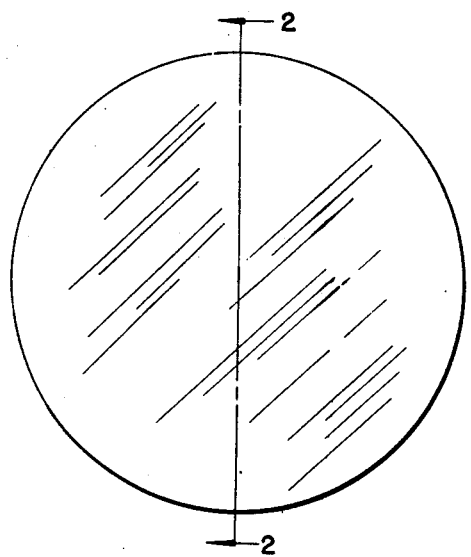
Fig. 1 is a face view of the finished article embodying the invention.
Figure 2:
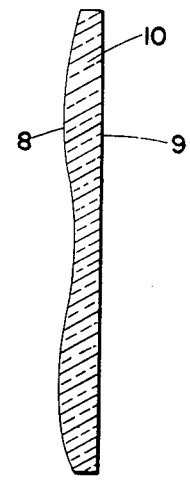
Fig. 2 is a sectional view taken as on line 2—2 of said article.
Figure 3:
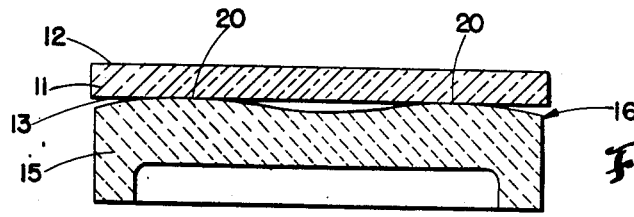
Fig. 3 is a sectional view of the initial blank and support used in dropping.

Referring more particularly to the drawings wherein like characters of reference designate like parts throughout the several views a finished article is illustrated in Fig. 1. This article is known as a Schmidt plate and is given only by way of illustration of applicant's invention. The said article comprises an optical surface 8 of controlled non-spherical curvature on one side thereof and having a relatively plano optical surface 9 on the opposed side thereof. The body 10 may be formed of glass having a relatively high ultra-violet or infra-red transmission. This type of plate is given by way of illustration of the invention as it is one which is extremely difficult if not impractical to be formed in quantity production by grinding and polishing methods.

Figure 4:
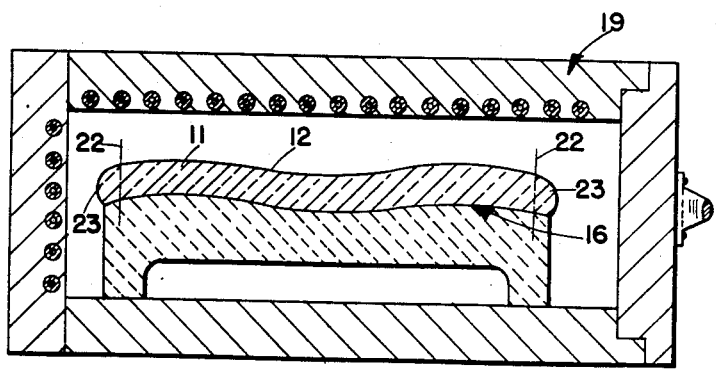
Fig. 4 is a diagrammatic sectional view showing the supported blank in a heating device and showing the blank dropped under the action of heat.
Figure 5:
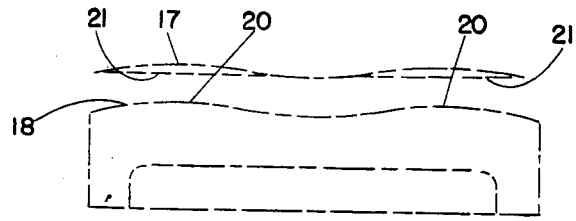
Fig. 5 is a diagrammatic view illustrating a step in the process of determining the correction of the original curve put on a refractory in order to obtain the exact curve desired in the finished article.

In following the invention a glass blank 11 is formed to a controlled thickness with substantially parallel optical surfaces 12 and 13 thereon. A support 15 is next formed with a supporting surface 16 initially shaped substantially to the shape desired of the finished surface 8. This is accomplished, as shown diagrammatically in Fig. 5, by computing the curves required to produce the surface 8, as illustrated by the dot and dash line 17. A curve 18 substantially parallel with the curve 17 and spaced from said curve 17 by an amount substantially equal to the thickness of the blank 11 is then computed and formed on the refractory thereby producing the initial supporting surface 16. The refractory 15 having the blank 11 thereon is then placed within a suitable heating furnace 19 as diagrammatically illustrated in Fig. 4 and the said blank 11 is heated to a temperature sufficient to cause it to become plastic and drop to the shape of the surface 16. This causes the upper surface 12 opposite the refractory to become altered with a view to assuming the desired surface shape of the finished surface 8. It has been found, however, that due to the particular nature of the glass of the blank, the thickness of said blank, shape of resultant surface desired and temperature required in dropping said glass blank that the outer surface 12 does not assume the shape of the computed surface shape 17. This is due to the fact that the glass has a tendency to flow in a sidewise direction throughout different portions thereof particularly in the vicinity of the high points 20 of the supporting surface 16 causing the surface curvatures at said locations to be flatter than those desired as illustrated diagrammatically by the dash lines 21 in Fig. 5.

The departure of the surface 12, as initially dropped, from that of the computed surface shape 17 is then determined. The shape of the surface 16 is then altered as to shape by an amount sufficient to compensate for the departure of the dropped curve 12 from that of the computed curve 17. This is accomplished by building up or reducing different portions of the curve 16 by amounts sufficient to compensate for said variations in surface shapes desired. The above may require the dropping of several different curves and several different alterings of the surface shape 16.

After having once obtained the surface shape required of the surface 16 in order to obtain the computed curves of the surface 17 for a particular composition of glass and dropping temperature required, several successive blanks may be supported and dropped to the surface shape required with the said resultant surfaces being accurately controlled and of the consistent shape desired. Several of such refractories may be formed with the proper modified surface 16 thereon for glass blanks of said glass composition and requiring substantially the same dropping temperature. After the blanks 11 have been dropped to the surface shape required the opposed surface 9 may be ground and polished down to a plano or to a desired spherical curve by the usual grinding and polishing methods. Care being taken, however, that the said surface is disposed in proper optical relation with the dropped surface 8. Due to the fact that the surface 12 is initially an optical surface of high qualities the resultant surface 8 will have said desired optical qualities. One of the controlling features in obtaining the required consistency of the finished dropped surface 8 resides in the particular material used in forming the refractory and in the particular controlling of said material which will produce a refractory having little or no tendency to expand or contract or become distorted as to supporting surface shape during the actual dropping process.

A composition for producing a material having the above desirable characteristics is substantially as follows:

| | | |
|---|---|---:|
| Kyanite | grams | 2400 |
| Ball clay | do | 800 |
| Chrome oxide | do | 800 |
| Sodium carbonate | do | 4 |
| Sodium silicate | do | 8 |
| Triethanolamine | cc | 2 |
| Water | grams | 1000 |

This composition of material is preferably formed by initially dissolving the sodium carbonate and sodium silicate, which are dispersing agents, in the required amount of water. The ball clay of an amount required depending upon the amount of Kyanite to be used is then added while stirring to produce a thorough mixture. The required amount of chrome oxide (green) is then placed in the mixture and thoroughly stirred therein. The Kyanite is then added while mixing as fast as the mixture will disperse the said Kyanite without forming large lumps. A small amount of triethanolamine is then added to the batch or mixture and thoroughly stirred therein. The resultant composition is then molded or cast substantially to the shape of the refractory desired and substantially to the surface shape desired of the supporting surface 16. The molded or cast composition is then heated at a relatively low temperature of an amount sufficient to remove the water and is thereafter subjected to increased temperature until a maximum temperature is arrived at which will properly fire the refractory and cause the particles of the composition thereof to properly adhere with each other. The initial shaping of the surface 16 may be required and this is then performed. A blank 11, such as described above, is placed on the refractory and the assembly is heated in a suitable furnace to a temperature sufficient to cause the blank to drop and assume the shape of the supporting surface 16. The departure of the formed surface 8 is then determined by comparison thereof with the computed curve 17 and the surface 16 is altered accordingly. This is preferably accomplished by initially soaking the refractory in water until it becomes suitably saturated. A portion of the supporting surface which departs from the surface shape desired is then built up by placing a suitable amount of the composition of the refractory material as initially formed and by shaping the newly deposited material to the surface shape required and if desired some of the material of the supporting surface may be removed at required locations. The refractory having the newly built-up portions on the surface thereof is then subjected to the relatively low temperature required to remove the water and the temperature is then increased until a suitable high temperature is reached to produce the desired firing and cohesion of the particles of the composition. A new blank is then placed on the refractory and dropped in a manner similar to that set forth above and the resultant surface 8 is then checked with the computed curve 17 to determine its accuracy. If required, one or more repetitive operations of this character may be performed until the proper shape of supporting surface is obtained to produce the resultant shape of surface 8.

It will be seen that by proper modification of the shape of the supporting surface 16 a true surface shape of that of the computed curve 17 may be obtained on the surface 8.

After the blank has been dropped to the shape desired and the surface 9 has been formed thereon the said blank is cut to the required contour shape. This cutting is diagrammatically illustrated in Fig. 4 as being formed along the dash lines 22 to remove edge portions 23 of the blank.

It is to be understood that if a glass of a different composition requiring different dropping temperatures is used the shape of the supporting surface 16 will have to be altered accordingly.

The composition set forth above produces a refractory which after once having been fired will retain substantially the shape to which it is formed and will not depart from said shape during the actual use thereof in dropping the blanks to the shape desired. This also contributes to the forming of extremely accurately dropped curves 8 and provides a more positive control for obtaining successive articles having controlled consistent surface shapes 8 thereon.

Another desirable characteristic of a refractory formed of the composition set forth above is that the said refractory inherently possesses characteristics which obviates adherence of the glass blank to the supporting surface and is of the type which requires no initial dusting material such as was required with most prior art refractories. This also contributes greatly to the more positively controlling of the resultant shape of the surface 8 and enables the use of the refractory for repetitive dropping while retaining the desired accuracy of the formed surface 8.

Figure 6:
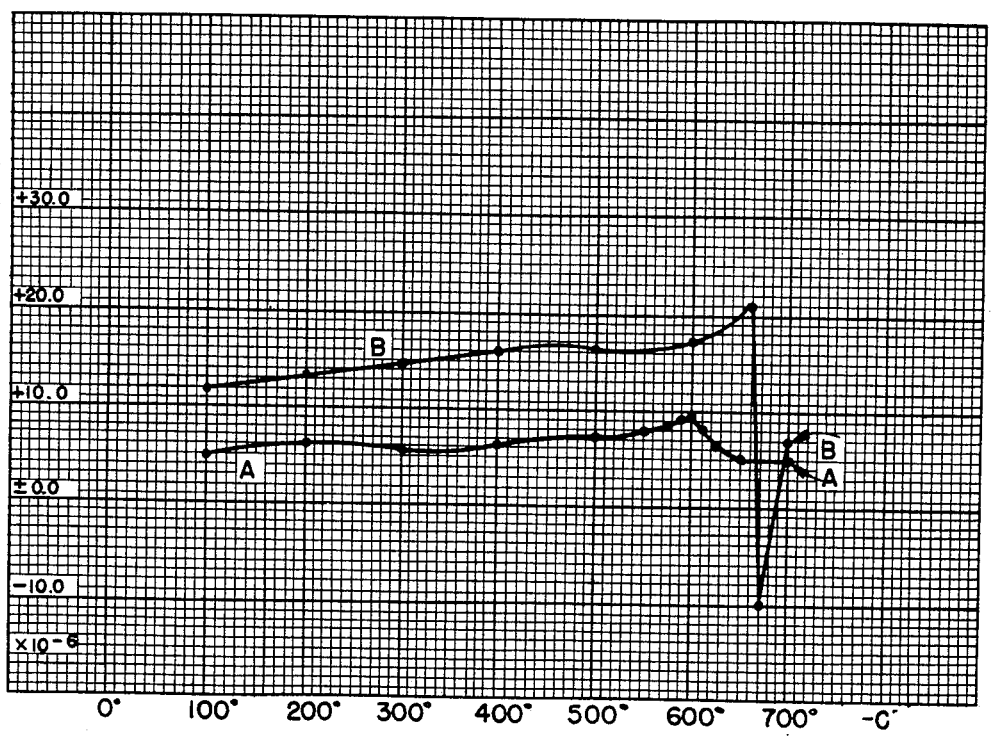
Fig. 6 is a chart illustrating the coefficient of expansion curve.

In Fig. 6 there is diagrammatically illustrated the coefficient of expansion curve obtained through the use of a composition such as set forth above. With the present refractory this curve is illustrated at A in the chart illustrated in Fig. 6 and is obviously quite uniform. In said figure there is also diagrammatically illustrated at B the expansion curve of a prior art type of support formed particularly of special normalized cast steel. It will be noted that between 600 to 700° C. there is an abrupt change in the expansion curve. This abrupt change would be within the temperature required in heating the blank 11 to cause said blank to drop to the shape of the supporting surface 16 and would thereby introduce great error in the shape of the resultant surface 8. By reason of the fact that the expansion curve of the composition set forth by applicant is substantially uniform little or no difficulty would be encountered as to surface shape distortion and departure of the resultant surface from that of the shape desired.

Although the material of the refractory, such as set forth above, lends itself well to obtaining greater accuracy of surface shape 8 the prime factor in obtaining said accuracy resides in the proper modification or control of the supporting surface 16 according to the nature of the glass used in forming the blank and according to the dropping temperatures required.

It is to be understood that the composition set forth above is given only by way of illustration of a composition which will have the non-adhering characteristics desired and the substantially uniform coefficient of expansion required as materials, such as Andalucite and Silliminite, may be used instead of the Kyanite and dispersing agents other than those set forth above may be used such as morphaline, lignin, sodium galate, etc., tannic acid or other non-dispersive agents may also be used.

The major control of the composition for obtaining the expansion curve control as shown in Fig. 6 resides in the proportions of the Kyanite and ball clay content. Kyanite has a tendency to expand while ball clay has a tendency to shrink so that by controlling the proportions of each according to their tendencies to shrink or expand the resultant composition of the refractory may be controlled so as to more definitely maintain its size and shape.

Although applicant has shown and described the forming of a Schmidt plate type article it is to be understood that any other article formed of similar materials may be formed either with or without surfaces other than spherical surfaces with the resultant dropped surfaces being more accurately controlled than has been possible with known prior art dropping methods.

The outer surface 12 of the blank is initially ground and polished to an optical surface and the opposed surface 13 is preferably a ground surface substantially parallel with the surface 12. The resultant dropped article therefore has an outer surface 8 of a texture resulting from the initial grinding and polishing and from the reaction of said surface to the heat during dropping. This surface is of a controlled dropped shape and the resultant article is finished with an optically polished surface on the side opposed to the dropped surface.

The temperature required in dropping the glass blanks to shape depends of course on the type of glass used. Care is taken in all instances to so control the temperature that it is not above that required to soften the glass only sufficiently to permit it to drop and conform to the supporting surface of the refractory. In no instance should the temperature be sufficient to really melt the glass and permit it to flow freely. It must be a viscous flow. The temperature is arrested at the point where the glass will soften only sufficiently to drop to the shape of the supporting surface of the refractory and the required temperature will be known to anyone skilled in the art or may be determined by trial methods.

By examining the side 13 of the plate 11 after dropping, one can tell whether or not there has been contact with the surface 16 of the block 15. If the contact is not entirely throughout the surface 13, a slightly higher temperature or a longer time of heating should be used.

In controlling the expansion and contraction of the refractory, it is particularly desirable to so control the material of the refractory that within the heating cycle the expansion and contraction of the refractory will be substantially the same as the glass. It has been found that most prior art supports or refractories during heating and cooling tend to grow or decrease in dimension in repeated cycles thereby rendering them impractical for repetitive use. The refractory of the present invention is therefore controlled so that the above difficulty with most prior art refractories is overcome and substantially all tendency of the refractory to expand or contract differently than the glass and inconsistently at some temperature within the heating cycle is eliminated.

The clays and chromatic oxide of the refractory absorbs the infra-red radiation which passes through the glass during the heating and dropping and thus tends to heat the glass from both sides. This results in more uniform heating.

Ordinary glass absorbs radiations longer than 4000 millimicrons. For low temperature sources such as a furnace heated to below 300° to 400° C. the radiation is of such a wave length that a large part of the radiation is absorbed by the glass. As the temperature of the furnace is raised, more and more of the infra-red radiation passes through the glass and is absorbed by the refractory thereby increasing the uniformity of the heating of the glass from both sides. The more uniformly the heat is distributed during the dropping operation, the less influence of extraneous changes there will be. Greater uniformity in dropping will therefore be obtained and more desirable repetitive droppings may be obtained.

Infra-red absorbing agents other than chromic oxide such as rouge, manganese oxide or the like may be used but do not seem to be as permanent as the chromic oxide.

The refractory is not only of such a nature as to render it possible to alter the supporting surface thereof in a simple and efficient manner but also possesses characteristics whereby the blanks may be dropped directly on the surface of the refractory with no danger of adhering. It also is more uniform as to expansion and contraction within the critical heating temperatures required in dropping with the result that more positively controlled shapes of dropped surfaces may be obtained. The infra-red absorbing characteristics result in a more uniform heating of the article being dropped and also contribute to the resultant accuracy.

From the foregoing description, it will be seen that simple, efficient and economical means and methods have been provided for producing dropped glass articles having more accurately formed optical surfaces thereon.

Having described my invention, I claim:

1. An optical element of the character described, said optical element comprising a plate-like member of glass of a given index of refraction having infra-red ray transmission characteristics of radiation shorter than 4000 millimicrons, said plate-like member having on one side thereof a heat-flowed previously ground and polished finished optical surface of a controlled substantially continuous uninterrupted compound curvature, said compound curved surface resulting from the flowing of an optically finished ground and polished surface provided on said member to said compound curvature under the action of heat and subsequent cooling, when said member is supported on the surface of a molding block adapted to absorb said infra-red rays transmitted through the glass during the heating thereof and to retain its initially formed shape on cooling, said ground and polished surface forming the outer surface of the member and flowing simultaneously to said compound curvature as the under surface of the member is caused by said heating and cooling to assume the shape of the surface of the molding block, said heat-flowed controlled compound curvature having a plurality of different centers of curvature disposed transversely of said surface and in controlled spaced relation thereto so as to cause said surface to vary from a plane by controlled graded amounts, the variations in thickness of the member and the index of refraction of the glass controlling the light ray directing characteristics of the optical element and said heat-flowed compound curved surface having its optical precision of shape control, surface quality, texture and optical finish similar to its initial ground and polished optical finish, said plate-like member having a ground and polished optical finished surface on the opposed side thereof.

2. An optical element of the character described, said optical element comprising a plate-like member of glass of a given index of refraction having infra-red ray transmission characteristics of radiation shorter than 4000 millimicrons, said plate-like member having on one side thereof a heat-flowed previously ground and polished finished optical surface of a controlled substantially continuous uninterrupted compound curvature, said compound curved surface resulting from the flowing of an optically finished ground and polished surface provided on said member to said compound curvature under the action of heat and subsequent cooling, when said member is supported on the surface of a molding block adapted to absorb said infra-red rays transmitted through the glass during the heating thereof and to retain its initially formed shape on cooling, said ground and polished surface forming the outer surface of the member and flowing simultaneously to said compound curvature as the under surface of the member is caused by said heating and cooling to assume the shape of the surface of the molding block, said heat-flowed controlled compound curvature having a plurality of different centers of curvature disposed transversely of said surface and in controlled spaced relation thereto so as to cause said surface to vary from a plane by controlled graded amounts, and with at least one of said centers being located on a side of the surface opposed to the side on which the remaining centers are located, the variations in thickness of the member and the index of refraction of the glass controlling the light ray directing characteristics of the optical element and said heat-flowed compound curved surface having its optical precision of shape control, surface quality, texture and optical finish similar to its initial ground and polished optical finish, said plate-like member having a ground and polished optical finished surface on the opposed side thereof of substantially a plane shape.

3. An optical element of the character described, said optical element comprising a plate-like member of glass of a given index of refraction having infra-red ray transmission characteristics of radiation shorter than 4000 millimicrons, said plate-like member having on one side thereof a heat-flowed previously ground and polished finished optical surface of a controlled substantially continuous uninterrupted compound curvature, said compound curved surface resulting from the flowing of an optically finished ground and polished surface provided on said member to said compound curvature under the action of heat and subsequent cooling, when said member is supported on the surface of a molding block adapted to absorb said infra-red rays transmitted through the glass during the heating thereof and to retain its initially formed shape on cooling, said ground and polished surface forming the outer surface of the member and flowing simultaneously to said compound curvature as the under surface of the member is caused by said heating and cooling to assume the shape of the surface of the molding block. said heat-flowed controlled compound curvature having a plurality of different centers of curvature disposed transversely of said surface and in controlled spaced relation thereto so as to cause said surface to vary from a plane by controlled graded amounts, the variations in thickness of the member and the index of refraction of the glass controlling the light ray directing characteristics of the optical element and said heat-flowed compound curved surface having its optical precision of shape control, surface quality, texture and optical finish similar to its initial ground and polished optical finish, said plate-like member having a ground and polished optical finished surface on the opposed side thereof of substantially spherical shape.

EDGAR D. TILLYER.

REFERENCES CITED

The following references are of record in the file of this patent:

UNITED STATES PATENTS

| Number | Name | Date |
| --- | --- | --- |
| 4,786 | Paine | Oct. 3, 1846 |
| 1,416,947 | Dey | May 23, 1922 |
| 1,536,828 | Drescher | May 5, 1925 |
| 1,619,341 | Gagnon | Mar. 1, 1927 |
| 1,905,644 | Laabs | Apr. 25, 1933 |
| 2,170,979 | Straubel | Aug. 29, 1939 |

FOREIGN PATENTS

| Number | Country | Date |
| --- | --- | --- |
| 3,444 | Great Britain | 1909 |